US011265890B2

(12) United States Patent
Ren et al.

(10) Patent No.: US 11,265,890 B2
(45) Date of Patent: Mar. 1, 2022

(54) RESOURCE RATE MATCHING FOR REMOTE INTERFERENCE MANAGEMENT

(71) Applicant: QUALCOMM Incorporated, San Diego, CA (US)

(72) Inventors: Yuwei Ren, Beijing (CN); Seyedkianoush Hosseini, San Diego, CA (US); Huilin Xu, San Diego, CA (US); Naga Bhushan, San Diego, CA (US); Jay Kumar Sundararajan, San Diego, CA (US); Yeliz Tokgoz, San Diego, CA (US); Joseph Binamira Soriaga, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 16/539,659

(22) Filed: Aug. 13, 2019

(65) Prior Publication Data

US 2020/0059943 A1    Feb. 20, 2020

Related U.S. Application Data

(60) Provisional application No. 62/764,949, filed on Aug. 17, 2018.

(51) Int. Cl.
*H04W 72/12* (2009.01)
*H04B 17/345* (2015.01)
*H04W 88/08* (2009.01)

(52) U.S. Cl.
CPC ...... *H04W 72/1226* (2013.01); *H04B 17/345* (2015.01); *H04W 72/1268* (2013.01); *H04W 88/08* (2013.01)

(58) Field of Classification Search
CPC ......... H04W 72/1226; H04W 72/1268; H04W 88/08; H04W 72/082; H04B 17/345; H04B 17/318; H04B 17/382; H04L 1/0013
See application file for complete search history.

(56) References Cited

U.S. PATENT DOCUMENTS

2017/0303274 A1    10/2017  He et al.
2019/0280837 A1*   9/2019   Sano .................. H04W 72/0446
(Continued)

OTHER PUBLICATIONS

International Search Report and Writtenn Opinion—PCT/US2019/046509—ISA/EPO—dated Jan. 15, 2020.

(Continued)

*Primary Examiner* — Hoang-Chuong Q Vu
(74) *Attorney, Agent, or Firm* — Harrity & Harrity\Qualcomm

(57) ABSTRACT

Various aspects of the present disclosure generally relate to wireless communication. In some aspects, a first base station (BS) may detect remote interference, with one or more uplink communications on a physical uplink shared channel (PUSCH) associated with the first BS, caused by propagation of one or more reference signal (RS) communications, transmitted by a second BS, out of a coverage area of the second BS and into a coverage area of the first BS due to reflection of the one or more RS communications. The coverage area of the first BS and the coverage area of the second BS are non-overlapping coverage areas. The first BS may adjust, based at least in part on detecting the remote interference, one or more radio resource allocations of the PUSCH associated with the first BS. Numerous other aspects are provided.

24 Claims, 12 Drawing Sheets

(56) References Cited

U.S. PATENT DOCUMENTS

2019/0363843 A1* 11/2019 Gordaychik .......... H04L 1/1854
2019/0372641 A1* 12/2019 Muruganathan ..... H04B 7/0617
2020/0213052 A1*  7/2020 Li ........................ H04L 5/0048

OTHER PUBLICATIONS

NTT Docomo, et al., "Views on Remote Interference Management for NR", 3GPP Draft, 3GPP TSG RAN WG1 Meeting #94, R1-1809162_RIM, 3rd Generation Partnership Project (3GPP), Mobile Competence Centre, 650, Route Des Lucioles, F-06921 Sophia-Antipolis Cedex, France, vol. RAN WG1. No. Gothenburg, Sweden, Aug. 20, 2018-Aug. 24, 2018, Aug. 11, 2018 (Aug. 11, 2018), XP051516532, 6 Pages.

Panasonic: "Resource Reservation for NR DL", 3GPP Draft, R1-1802509, 3GPP TSG RAN WG1 Meeting #92, 3rd Generation Partnership Project (3GPP), Mobile Competence Centre, 650, Route Des Lucioles, F-06921 Sophia-Antipolis Cedex, France, No. Athens, Greece, Feb. 26, 2018-Mar. 2, 2018, Feb. 16, 2018 (Feb. 16, 2018), XP051397303, pp. 1-4, Retrieved from the Internet: URL:http://www.3gpp.org/ftp/tsg%5Fran/WG1%5FRL1/TSGR1%5F92/Docs/ [retrieved on Feb. 16, 2018] Section 2.

Partial International Search Report—PCT/US2019/046509—ISA/EPO—dated Nov. 15, 2019.

* cited by examiner

RESOURCE RATE MATCHING FOR REMOTE INTERFERENCE MANAGEMENT

CROSS-REFERENCE TO RELATED APPLICATION

This application claims priority to Provisional Patent Application No. 62/764,949, filed on Aug. 17, 2018, entitled "RESOURCE RATE MATCHING FOR REMOTE INTERFERENCE MANAGEMENT," which is hereby expressly incorporated by reference herein.

FIELD OF THE DISCLOSURE

Aspects of the present disclosure generally relate to wireless communication and to techniques and apparatuses for resource rate matching for remote interference management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first base station (BS), may include detecting remote interference, with one or more uplink communications on a physical uplink shared channel (PUSCH) associated with the first BS, caused by propagation of one or more reference signal (RS) communications, transmitted by a second BS, out of a coverage area of the second BS and into a coverage area of the first BS due to reflection of the one or more RS communications, wherein the coverage area of the first BS and the coverage area of the second BS are non-overlapping coverage areas; and adjusting, based at least in part on detecting the remote interference, one or more radio resource allocations of the PUSCH associated with the first BS.

In some aspects, a first BS for wireless communication may include memory and one or more processors operatively coupled to the memory. The memory and the one or more processors may be configured to detect remote interference, with one or more uplink communications on a PUSCH associated with the first BS, caused by propagation of one or more RS communications, transmitted by a second BS, out of a coverage area of the second BS and into a coverage area of the first BS due to reflection of the one or more RS communications, wherein the coverage area of the first BS and the coverage area of the second BS are non-overlapping coverage areas; and adjust, based at least in part on detecting the remote interference, one or more radio resource allocations of the PUSCH associated with the first BS.

In some aspects, a non-transitory computer-readable medium may store one or more instructions for wireless communication. The one or more instructions, when executed by one or more processors of a first BS, may cause the one or more processors to detect remote interference, with one or more uplink communications on a PUSCH associated with the first BS, caused by propagation of one or more RS communications, transmitted by a second BS, out of a coverage area of the second BS and into a coverage area of the first BS due to reflection of the one or more RS communications, wherein the coverage area of the first BS and the coverage area of the second BS are non-overlapping coverage areas; and adjust, based at least in part on detecting the remote interference, one or more radio resource allocations of the PUSCH associated with the first BS.

In some aspects, a first apparatus for wireless communication may include means for detecting remote interference, with one or more uplink communications on a PUSCH associated with the first apparatus, caused by propagation of one or more RS communications, transmitted by a second apparatus, out of a coverage area of the second apparatus and into a coverage area of the first apparatus due to reflection of the one or more RS communications, wherein the coverage area of the first BS and the coverage area of the second BS are non-overlapping coverage areas; and means for adjusting, based at least in part on detecting the remote interference, one or more radio resource allocations of the PUSCH associated with the first apparatus.

In some aspects, a method of wireless communication, performed by a BS, may include determining to transmit one or more remote interference management reference signal (RIM RS) communications; determining that transmission of the one or more RIM RS communications is to cause interference with transmission of one or more downlink communications that at least partially overlap with the transmission of the one or more RIM RS communications; reserving one or more radio resources for transmitting the one or more RIM RS communications based at least in part on determining that the transmission of the one or more RIM RS communications is to cause interference with the transmission of the one or more downlink communications, wherein the BS is to refrain from using the one or more radio resources to transmit the one or more downlink communications; and transmitting the one or more RIM RS communications using the one or more radio resources.

In some aspects, a BS for wireless communication may include memory and one or more processors operatively coupled to the memory. The memory and the one or more processors may be configured to determine to transmit one or more RIM RS communications; determine that transmission of the one or more RIM RS communications is to cause interference with transmission of one or more downlink communications that at least partially overlap with the transmission of the one or more RIM RS communications; reserve one or more radio resources for transmitting the one or more RIM RS communications based at least in part on determining that the transmission of the one or more RIM RS communications is to cause interference with the transmission of the one or more downlink communications, wherein the BS is to refrain from using the one or more radio resources to transmit the one or more downlink communications; and transmit the one or more RIM RS communications using the one or more radio resources.

In some aspects, a non-transitory computer-readable medium may store one or more instructions for wireless communication. The one or more instructions, when executed by one or more processors of a BS, may cause the one or more processors to determine to transmit one or more RIM RS communications; determine that transmission of the one or more RIM RS communications is to cause interference with transmission of one or more downlink communications that at least partially overlap with the transmission of the one or more RIM RS communications; reserve one or more radio resources for transmitting the one or more RIM RS communications based at least in part on determining that the transmission of the one or more RIM RS communications is to cause interference with the transmission of the one or more downlink communications, wherein the BS is to refrain from using the one or more radio resources to transmit the one or more downlink communications; and transmit the one or more RIM RS communications using the one or more radio resources.

In some aspects, an apparatus for wireless communication may include means for determining to transmit one or more RIM RS communications; means for determining that transmission of the one or more RIM RS communications is to cause interference with transmission of one or more downlink communications that at least partially overlap with the transmission of the one or more RIM RS communications; means for reserving one or more radio resources for transmitting the one or more RIM RS communications based at least in part on determining that the transmission of the one or more RIM RS communications is to cause interference with the transmission of the one or more downlink communications, wherein the apparatus is to refrain from using the one or more radio resources to transmit the one or more downlink communications; and means for transmitting the one or more RIM RS communications using the one or more radio resources.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
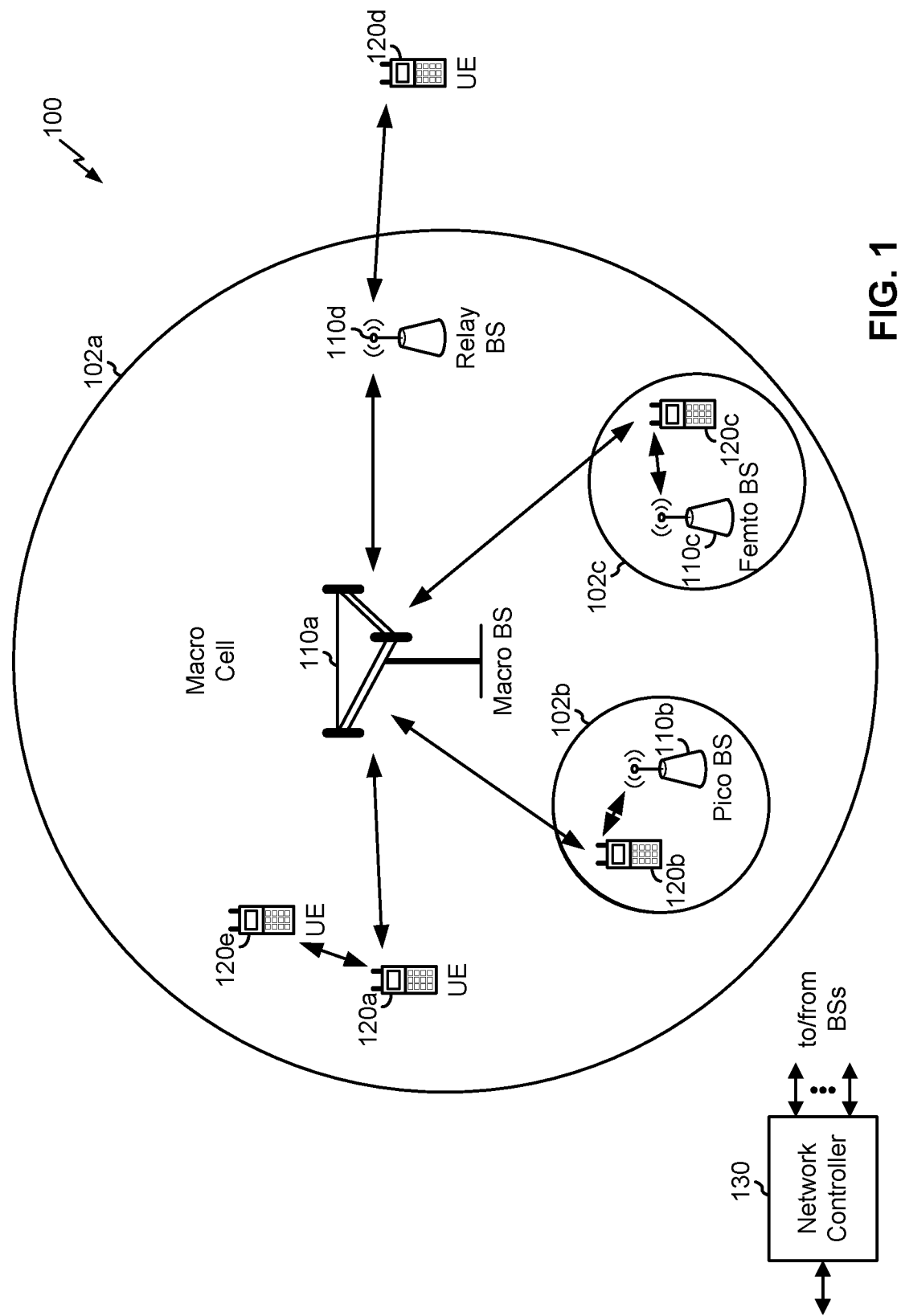
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
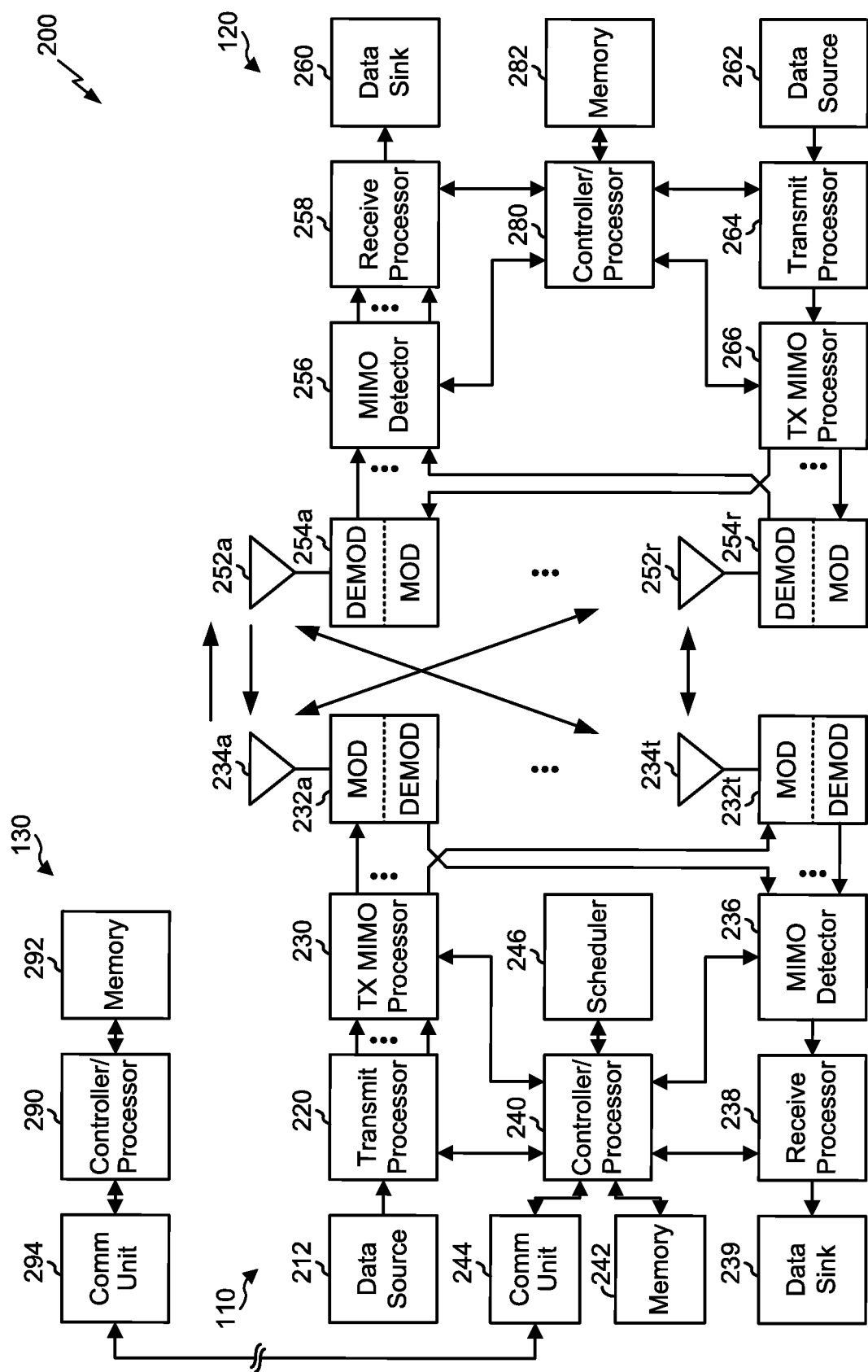
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with resource rate matching for remote interference management, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, a first BS 110 may include means for detecting remote interference, with one or more uplink communications on a physical uplink shared channel (PUSCH) associated with the first BS 110, caused by propagation of one or more reference signal (RS) communications, transmitted by a second BS 110, out of a coverage area of the second BS 110 and into a coverage area of the first BS 110 due to reflection of the one or more RS communications, wherein the coverage area of the first BS and the coverage area of the second BS are non-overlapping coverage areas, means for adjusting, based at least in part on detecting the remote interference, one or more radio resource allocations of the PUSCH associated with the first BS 110, and/or the like. In some aspects, a BS 110 may include means for determining to transmit one or more RIM RS communications, means for determining that transmission of the one or more RIM RS communications is to cause interference with transmission of one or more downlink communications that at least partially overlap with the transmission of the one or more RIM RS communications, means for reserving one or more radio resources for transmitting the one or more RIM RS communications based at least in part on determining that the transmission of the one or more RIM RS communications is to cause interference with the transmission of the one or more downlink communications, wherein the BS 110 is to refrain from using the one or more radio resources to transmit the one or more downlink communications, means for transmitting the one or more RIM RS communications using the one or more radio resources, and/or the like. In some aspects, such means may include one or more components of BS 110 described in connection with FIG. 2.

As indicated above, FIG. 2 is provided merely as an example. Other examples may differ from what is described with regard to FIG. 2.

Figure 3A:
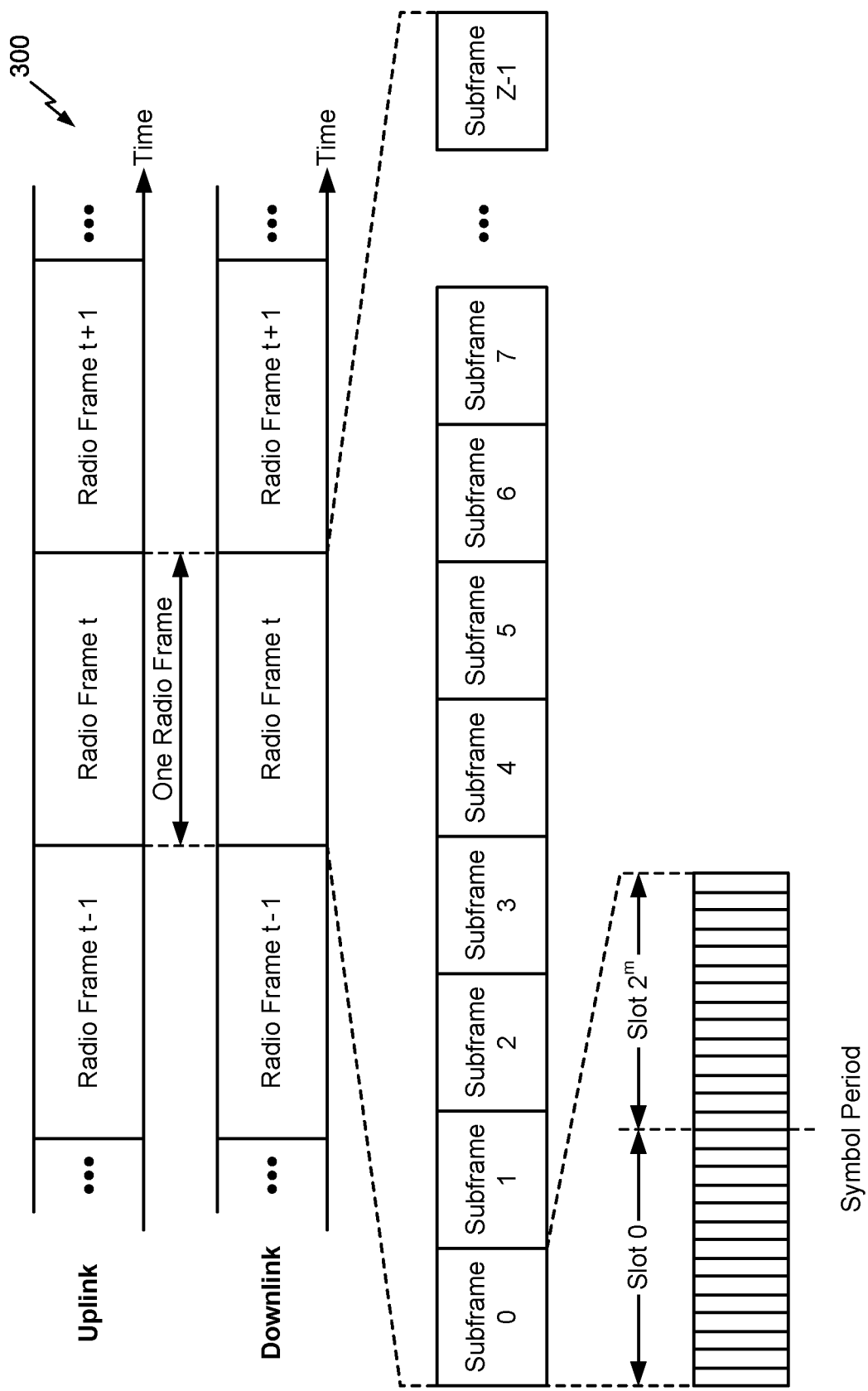
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
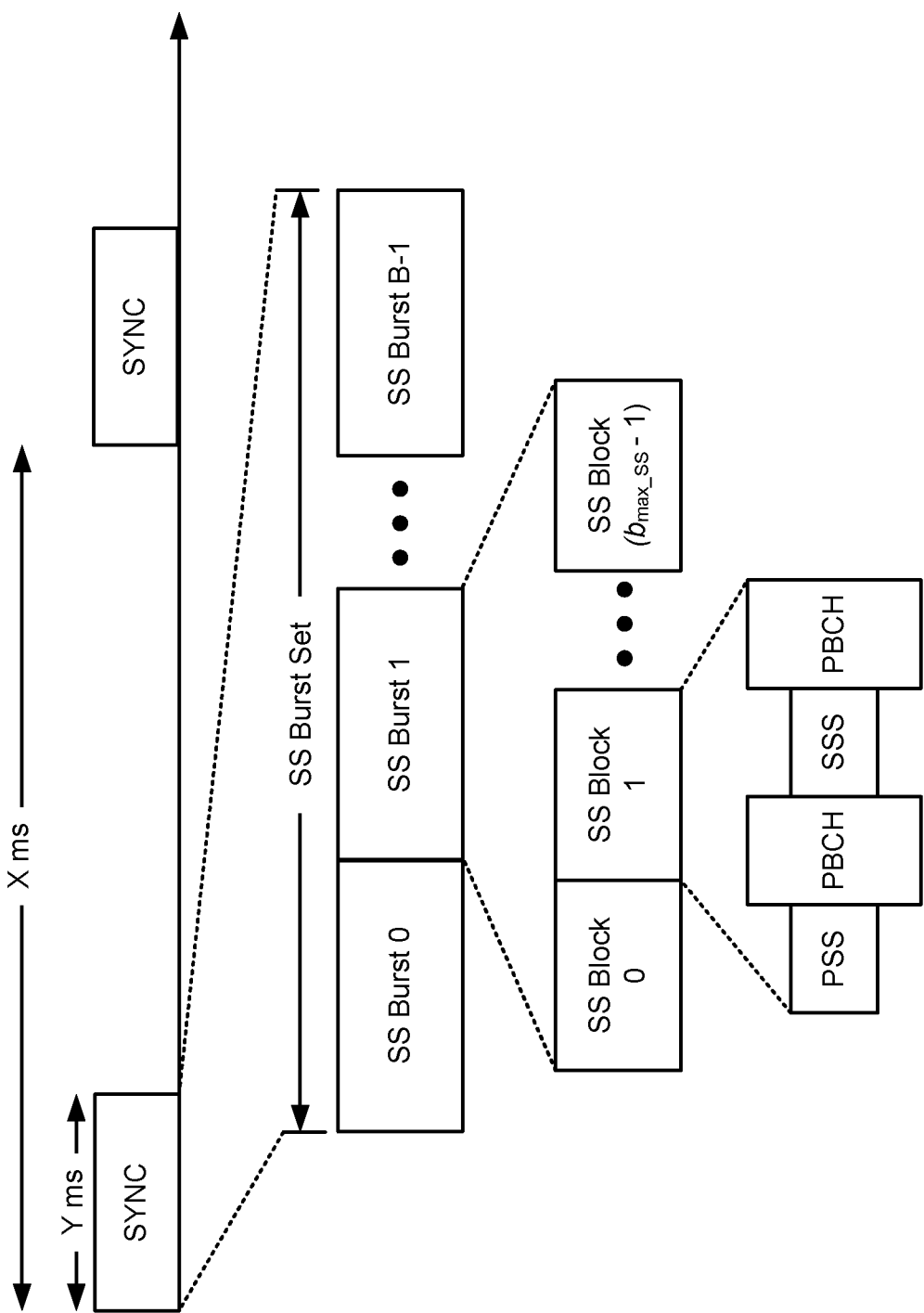
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
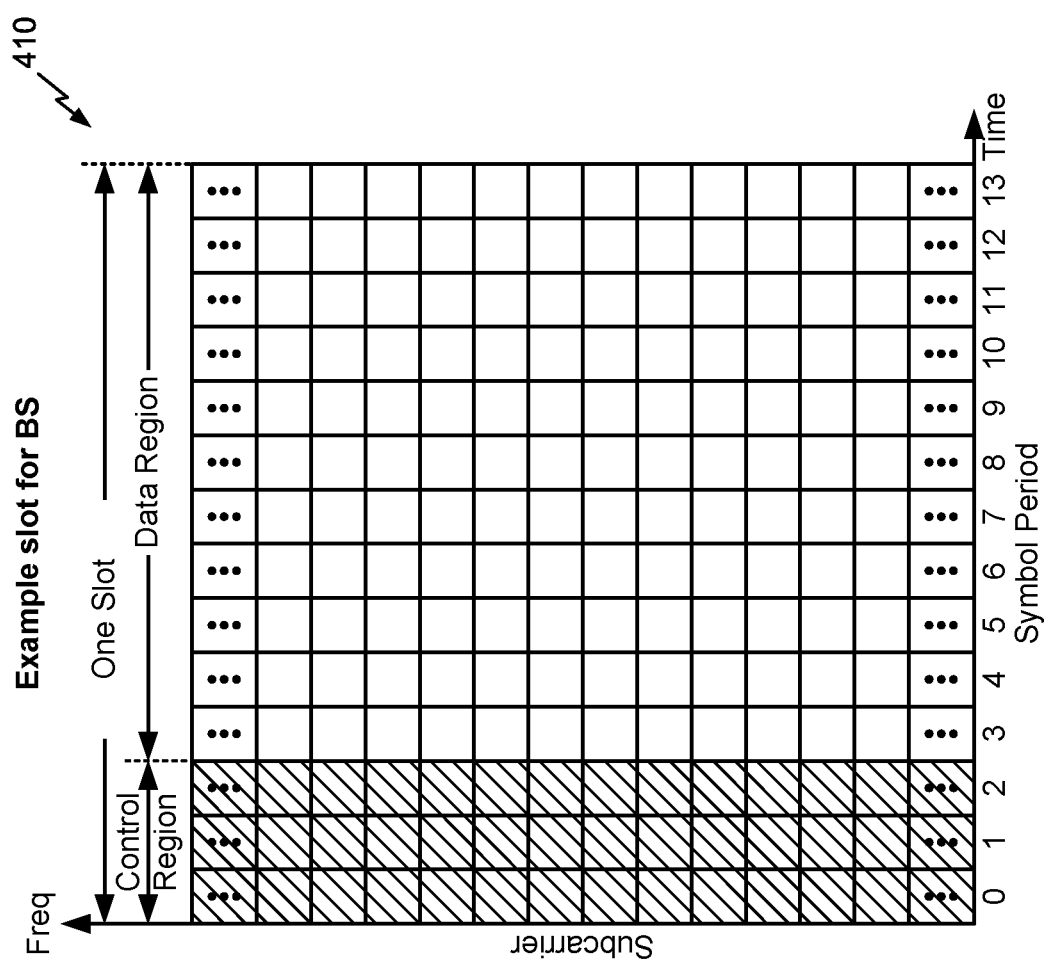
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q $\in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
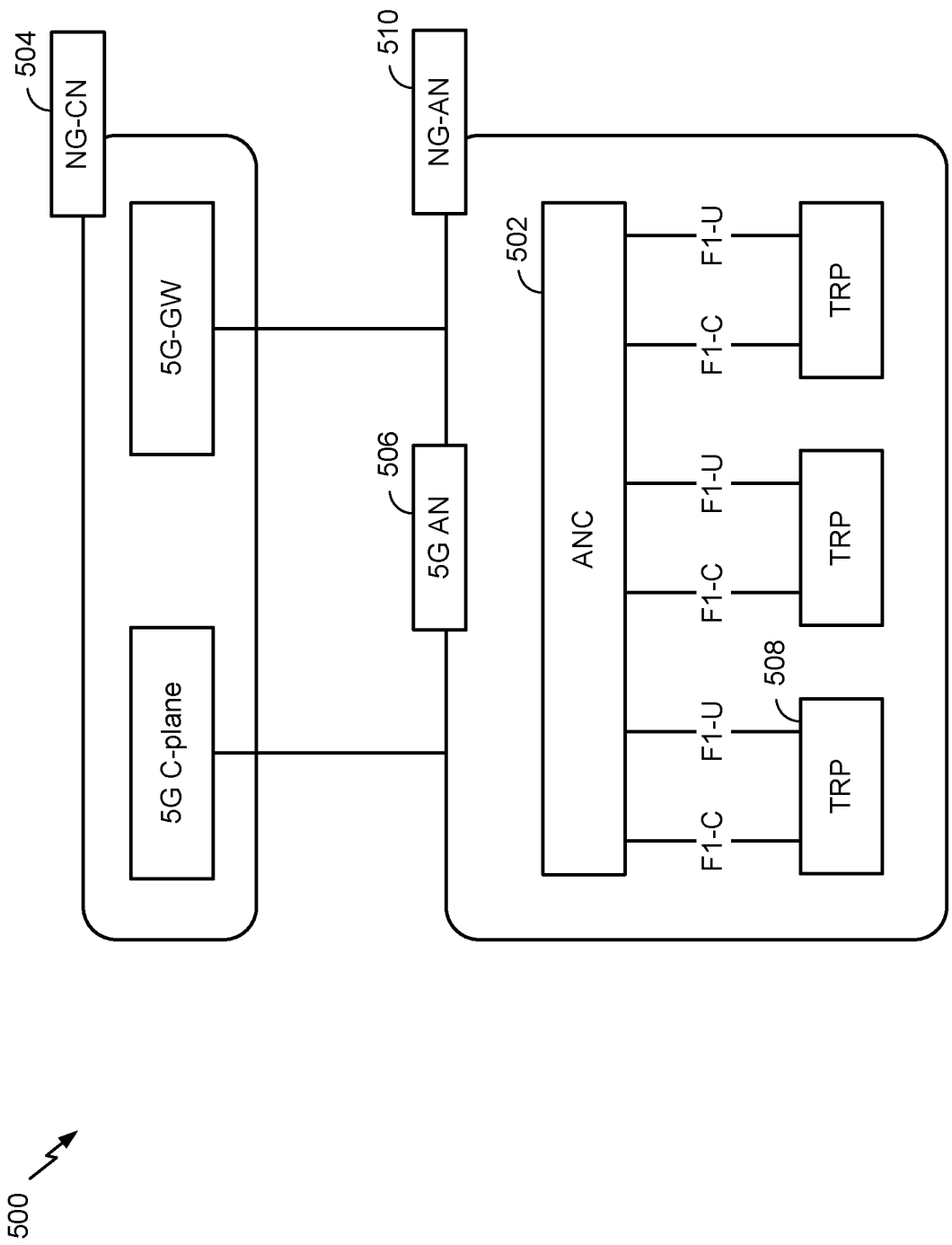
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
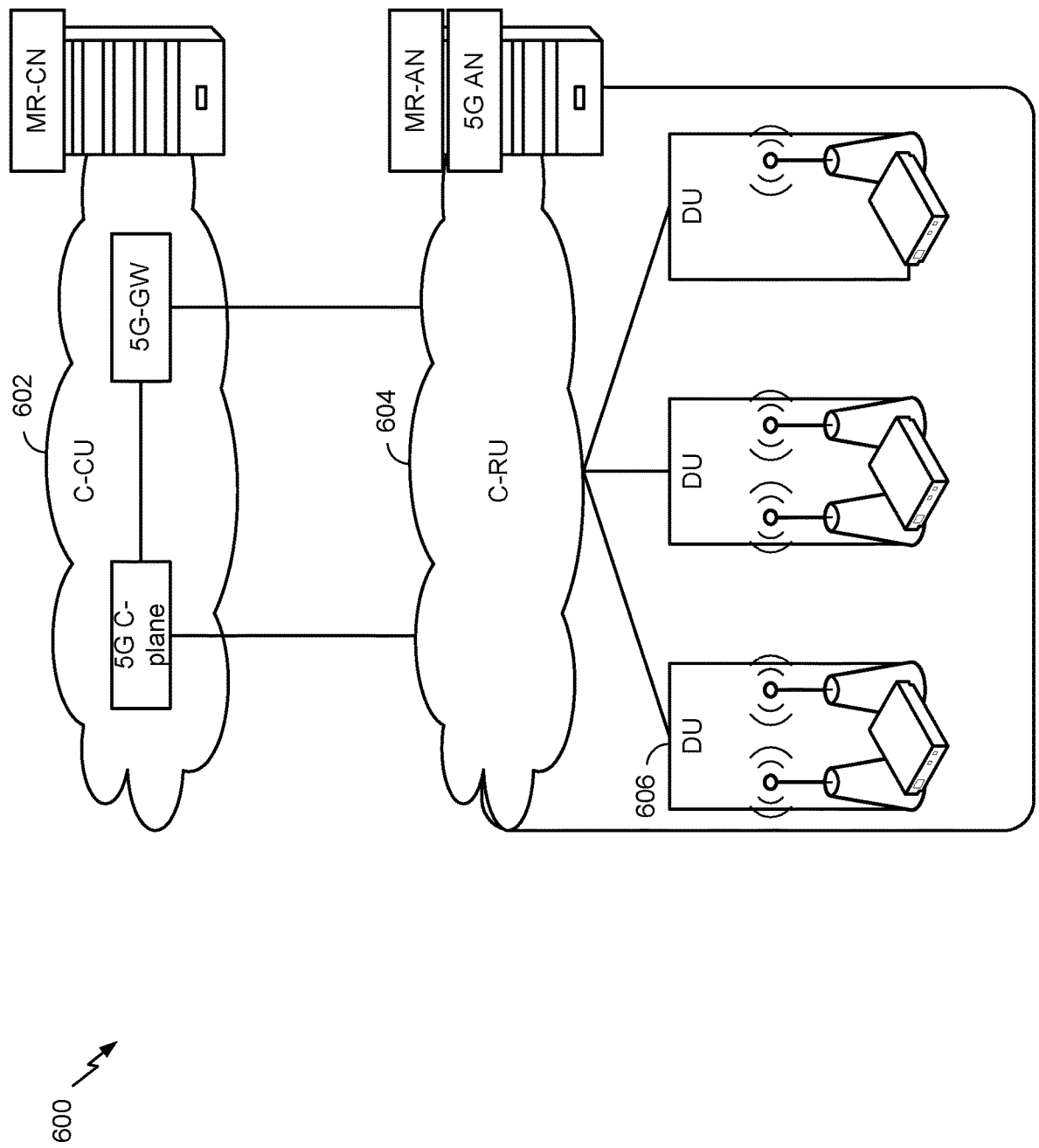
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In a communication system, a base station may transmit a downlink signal, which may be received by one or more UEs in and/or around the edge of a coverage area of the base station. In some cases, the transmission of the downlink signal may reach another base station due to signal reflection caused by various environmental factors, such as reflection off of mountains, reflection off of a surface of a body of water (e.g., a lake, an ocean, and/or the like), reflection due to atmospheric ducting, and/or the like.

In some cases, the downlink signal may cause interference in the coverage area of the other base station and/or in the coverage area of the base station. For example, propagation delay as a result of the distance between the base station and the other base station being large (e.g., on the order of tens or hundreds of kilometers) may cause the downlink signal to enter the coverage area of the other base station during scheduled uplink transmissions in the coverage area, and may interfere with, and/or entirely block, the uplink transmissions. As another example, the downlink signal may cause interference with other downlink signals transmitted in the coverage area of the base station.

Some aspects described herein provide techniques and apparatuses for resource rate matching for remote interference management. In some aspects, a receiver (e.g., a BS 110, a UE 120, and/or the like) may detect interference with one or more uplink communications on a PUSCH associated with the receiver. In some aspects, the interference may be caused by one or more reference signal (RS) communications transmitted by a transmitter (e.g., a BS 110, a UE 120, and/or the like). In some aspects, the receiver may adjust, based at least in part on detecting the interference, one or more radio resource allocations of the PUSCH associated with the receiver. In this way, the radio resources of the PUSCH associated with the receiver do not overlap with the radio resources used by the one or more RS communications that are transmitted by the transmitter. This minimizes interference between the radio resources of the PUSCH and the one or more RS communications, which increases reliability of the receiver and/or the transmitter by reducing the quantity of dropped communications caused by interference, which decreases processing, memory, and radio resource usage of the receiver and/or the transmitter by reducing the quantity of retransmissions of communications due to the interference, and/or the like.

In some aspects, a transmitter (e.g., a BS 110, a UE 120, etc.) may determine to transmit one or more RS communications and may reserve, based at least in part on determining to transmit the one or more RS communications, one or more radio resources for transmitting the one or more RS communications. In this way, the transmitter may refrain from using the one or more radio resources to transmit one or more downlink communications, and may transmit the one or more RS communications using the one or more radio resources. This minimizes and/or eliminates interference between the one or more RS communications and the one or more downlink communications, which in turn reduces the quantity of dropped communications caused by the interference and decreases processing, memory, and radio resource usage of the transmitter by reducing the quantity of retransmissions of downlink communications and/or RS communications due to the interference, and/or the like.

Figure 7A:
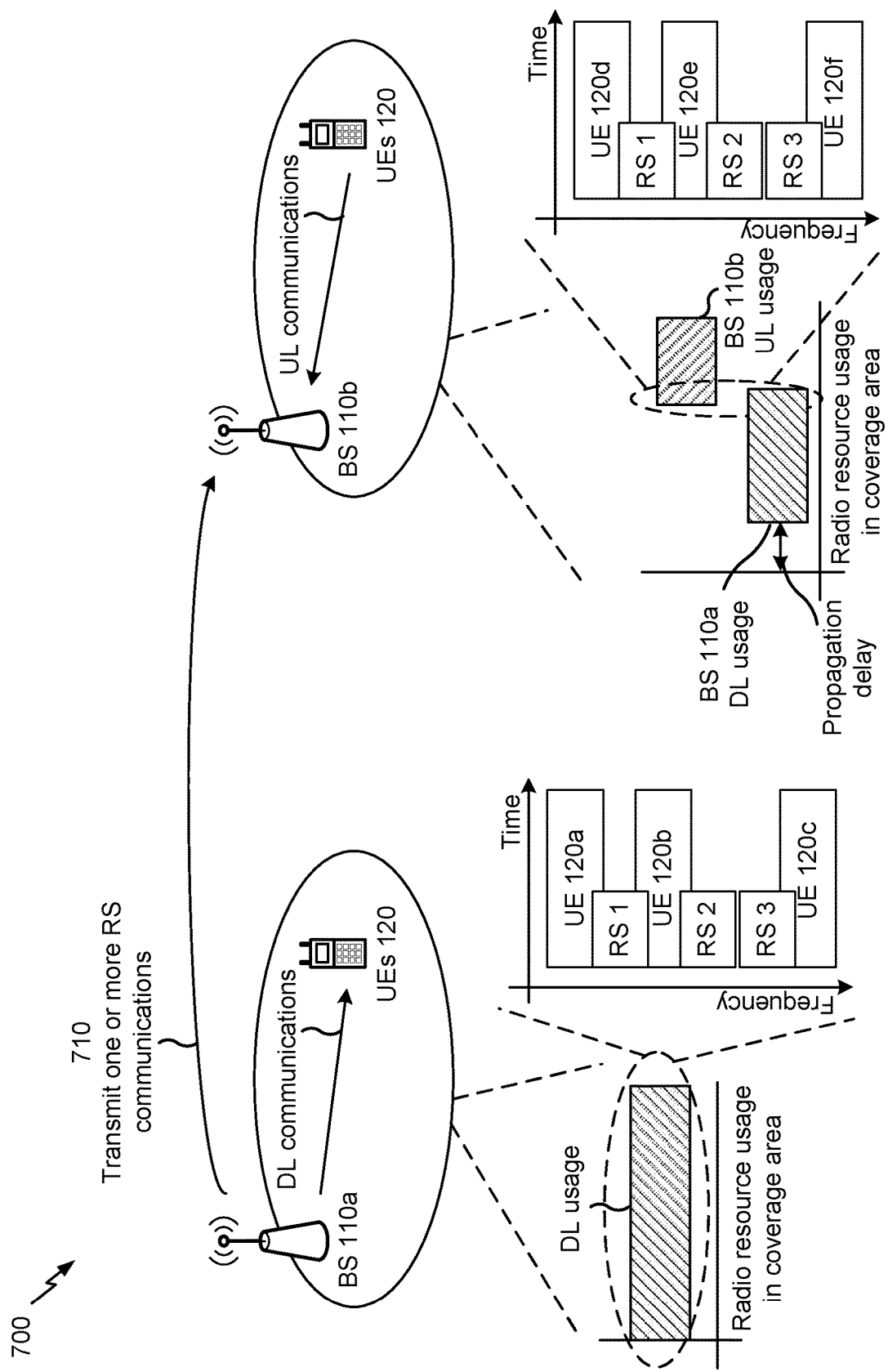
FIG. 7A-7C are diagrams illustrating an example of resource rate matching for remote interference management, in accordance with various aspects of the present disclosure.
Figure 7B:
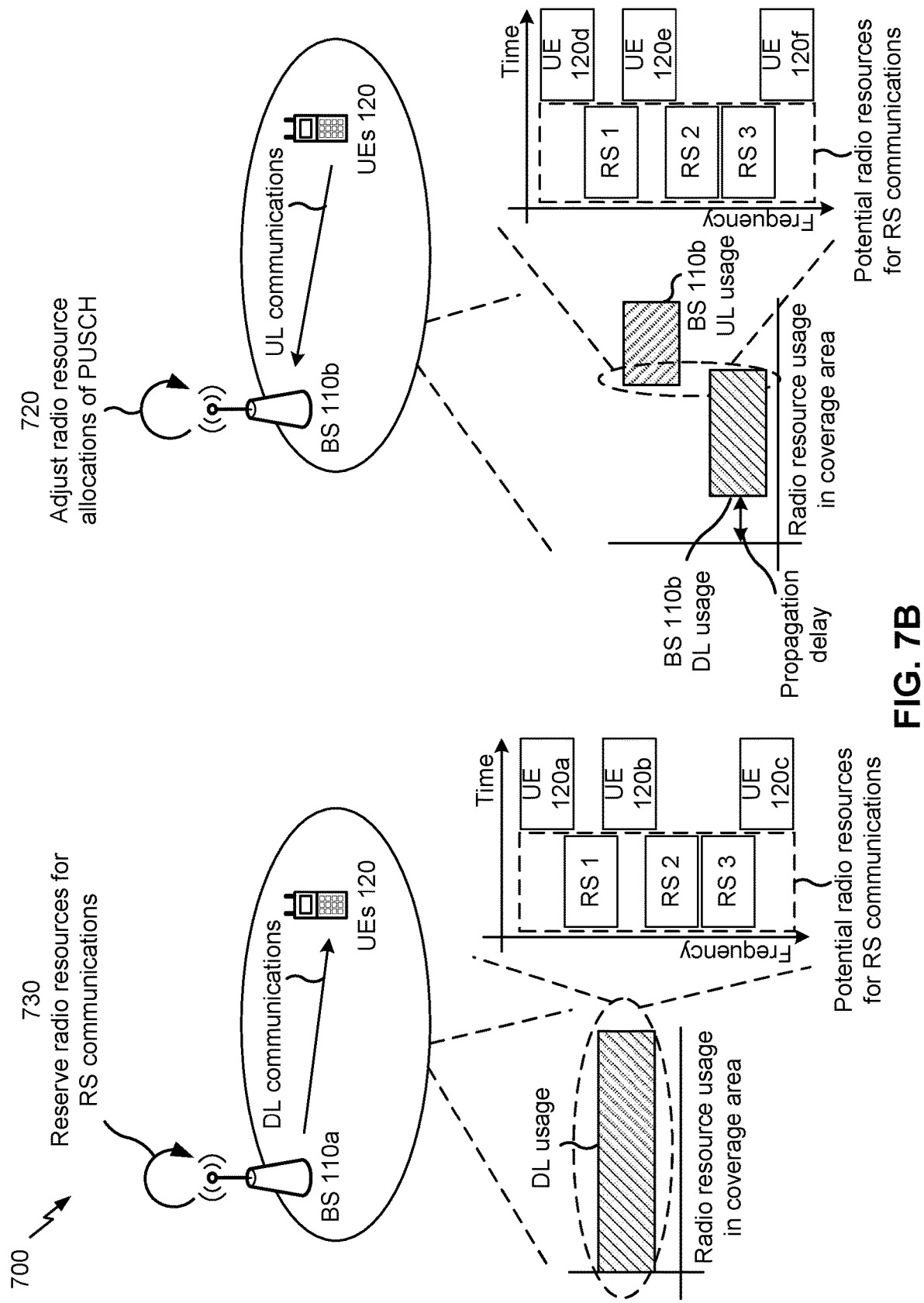
Figure 7C:
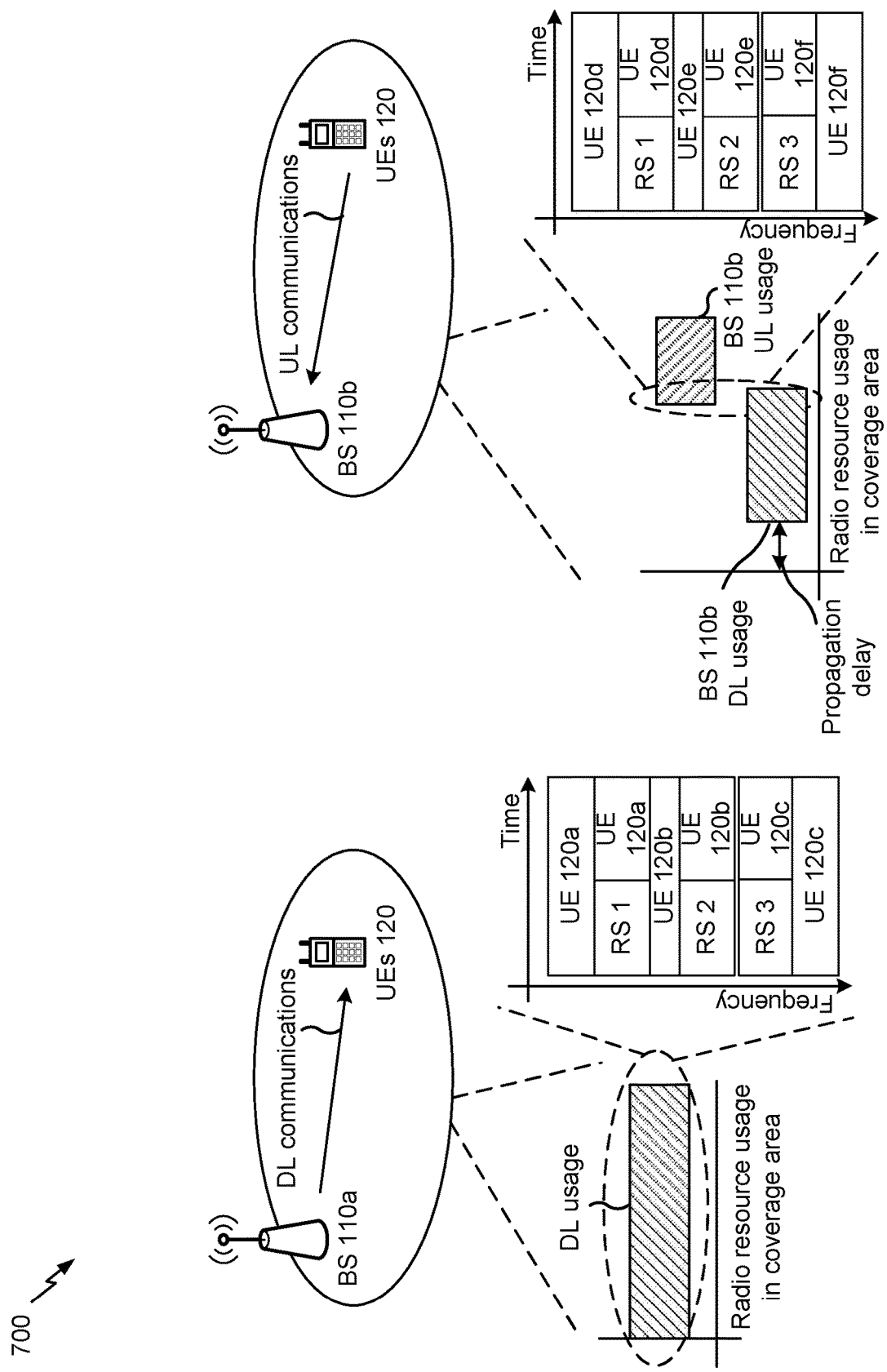

FIGS. 7A-7C are diagrams illustrating an example 700 of resource rate matching for remote interference management, in accordance with various aspects of the present disclosure. As shown in FIGS. 7A-7C, example 700 includes a plurality of BSs 110 (e.g., BS 110a, BS 110b, and/or the like) and a plurality of UEs 120 (e.g., UE 120a, UE 120b, UE 120c, UE 120d, UE 120f, and/or the like). In some aspects, BSs 110 and/or UEs 120 may be included in a same communication system, may be included in a plurality of different communication systems, and/or the like.

In some aspects, BS 110a and BS 110b may each be associated with a respective coverage area. For example, BS 110a may generate and provide a first coverage area, in which a plurality of UEs 120 (e.g., UE 120a, UE 120b, UE 120c, and/or the like) may be located; BS 110b may generate and provide a second coverage area, in which a plurality of UEs 120 (e.g., UE 120d, UE 120e, UE 120f, and/or the like) may be located; and/or the like. BS 110a and UEs 120 in the first coverage area may communicate using various types of communications, such as uplink communications, downlink communications, and/or the like. Similarly, BS 110b and UEs 120 in the second coverage area may communicate using various types of communications, such as uplink communications, downlink communications, and/or the like. In some aspects, the first coverage area and the second coverage area may not overlap, and/or may be geographically separated by a large distance (e.g., on the order of tens of kilometers, hundreds of kilometers, and/or the like).

As shown in FIG. 7A, BS 110a may transmit downlink communications in the first coverage area. For example, BS 110a may transmit downlink communications to UEs 120 in the first coverage area. As shown by reference number 710, in some aspects, BS 110a may transmit one or more reference signal (RS) communications (and thus may be referred to as a transmitter), which may be a type of downlink communication. For example, BS 110a may periodically transmit the one or more RS communications at a particular time interval, may semi-periodically transmit the one or more RS communications, may randomly transmit the one or more RS communications, and/or the like. In some aspects, a reference signal may include a demodulation reference signal (DMRS), a channel state information reference signal (CSI-RS), a phase tracking reference signal (PTRS), a sounding reference signal (SRS), a cell-specific reference signal (CRS), a primary synchronization signal (PSS), a secondary synchronization signal (SSS), one or more signals of a synchronization signal block (SSB), a remote interference management reference signal (RIM RS), and/or the like.

In some aspects, the one or more RS communications may cause interference in the communication system. For example, and as shown in FIG. 7A, the one or more RS communications may travel out of the first coverage area and into the second coverage area associated with BS 110*b*, and may cause interference in the second coverage area. BS 110*b* (which may be referred to as a receiver due to receiving the one or more RS communications) may detect the interference caused by the one or more RS communications, and may transmit a notification to BS 110*a* that the one or more RS communications are causing interference in the second coverage area. BS 110*a* may receive the notification and may adjust one or more downlink transmit parameters, associated with BS 110*a*, based on receiving the notification.

In some aspects, the interference in the second coverage area caused by the one or more RS communications may include interference with one or more uplink communications on a PUSCH associated with BS 110*b*. For example, and as shown in FIG. 7A, propagation delay due to the distance between BS 110*a* and BS 110*b* may cause the one or more RS communications to at least partially overlap the one or more uplink communications between BS 110*b* and UEs 120 in the second coverage area. As an example, a first RS communication (e.g., RS 1) may at least partially overlap an uplink communication transmitted by UE 120*d* and an uplink communication transmitted by UE 120*e*, a second RS communication (e.g., RS 2) may at least partially overlap the uplink communication transmitted by UE 120*e*, a third RS communication (e.g., RS 3) may at least partially overlap an uplink communication transmitted by UE 120*f*, and/or the like.

In some aspects, the transmission of the one or more RS communications may cause interference in the first coverage area. For example, and as shown in FIG. 7A, the transmission of the one or more RS communications may cause interference with one or more downlink communications that are transmitted by BS 110*a* to UEs 120 in the first coverage area. As an example, the first RS communication (e.g., RS 1) may at least partially overlap a downlink communication transmitted by BS 110*a* to UE 120*a* and a downlink communication transmitted by BS 110*a* to UE 120*b*, the second RS communication (e.g., RS 2) may at least partially overlap the downlink communication transmitted by BS 110*a* to UE 120*b*, a third RS communication (e.g., RS 3) may at least partially overlap a downlink communication transmitted by BS 110*a* to UE 120*c*, and/or the like. Since the one or more RS communications may be RIM RS communications, the RS communications may be transmitted with relatively large transmit power such that the RS communications travel long distances to reach the coverage areas of remote BSs (e.g., BS 110*b*). As a result, the relatively large transmit power of the RS communications may cause interference with the downlink communications that at least partially overlap with the RS communications.

As shown in FIG. 7B, BS 110*b* may mitigate and/or eliminate the interference, caused by the transmission of the one or more RS communications, with the one or more uplink communications on the PUSCH associated with BS 110*b*. As shown by reference number 720, BS 110*b* may detect the interference, caused by the transmission of the one or more RS communications, with the one or more uplink communications on the PUSCH associated with BS 110*b*, and may adjust, based at least in part on detecting the interference, one or more radio resource allocations of the PUSCH. In some aspects, BS 110*b* may detect the interference based on receiving a RS communication included in the one or more RS communications, based on receiving a sequence of RS communications included in the one or more RS communications, and/or the like.

In some aspects, BS 110*b* may adjust one or more radio resource allocations of one or more resource blocks associated with the PUSCH, one or more resource elements associated with the PUSCH, and/or any other resource unit included in a frame structure of the physical layer of BS 110*b*.

In some aspects, BS 110*b* may adjust the one or more radio resource allocations at the resource block level. For example, if BS 110*b* is unaware of a transmission scheduling associated with the transmission of the one or more RS communications, BS 110*b* may adjust the one or more radio resource allocations at the resource block level. As another example, BS 110*b* may determine a quantity of resource block symbols associated with the one or more uplink communications with which the one or more RS communications are interfering, may determine whether the quantity of resource block symbols satisfies a threshold quantity of resource block symbols (e.g., 2 symbols, 10 symbols, and/or the like), and may adjust, based at least in part on determining that the quantity of resource block symbols does not satisfy the threshold quantity of resource block symbols, the one or more radio resource allocations at the resource block level. As a further example, BS 110*b* may determine a signal strength of the one or more RS communications, may determine whether the signal strength satisfies a threshold signal strength (e.g., a received signal strength indication (RSSI) threshold, a reference signal received power (RSRP) threshold, and/or the like), and may adjust, based at least in part on determining that the signal strength does not satisfy the threshold signal strength, the one or more radio resource allocations at the resource block level.

In some aspects, to adjust the one or more resource allocations at the resource block level, BS 110*b* may determine one or more radio resources (e.g., resource blocks), associated with the BS 110*b*, with which the one or more RS communications are interfering, and may refrain from using the one or more resource blocks. As a result, BS 110*b* may refrain from using the radio resources (e.g., resource elements) used by BS 110*a* to transmit the one or more RS communications, as well as any other potential radio resources (e.g., resource elements), included in the one or more resource blocks, that may potentially be used by BS 110*a* to transmit the one or more RS communications, as shown in FIG. 7B. For example, and as shown in FIG. 7B, BS 110*b* may refrain from using the one or more resource blocks for the uplink communication on the PUSCH.

BS 110*b* may refrain from using the one or more resource blocks by transmitting an instruction to UEs 120 in the second coverage area instructing UEs 120 to refrain from using the one or more resource blocks to transmit the uplink communication. The instruction may include a rate-match bitmap-1 instruction (e.g., an instruction that specifies one or more frequencies that UEs 120 are not to use to transmit the uplink communication), a rate-match bitmap-2 instruction (e.g., an instruction that specifies one or more time slots, associated with the one or more resource blocks, that UEs 120 are not to use to transmit the uplink communication), a rate-match bitmap-3 instruction (e.g., an instruction that specifies an effective period of the frequency and the time configuration for the bitmap-1 and bitmap-2 instructions), and/or the like. In some aspects, the effective period of the frequency and the time configuration may be one time unit, five time units, ten time units, and/or the like. If BS 110*b* does not transmit a rate-match bitmap-3 instruction, or the rate-match bitmap-3 instruction is a zero value, the rate-match bitmap-1 instruction and the rate-match bitmap-2 instruction may be dynamic instead of static, in which case BS 110*b* may configure the rate-match bitmap-1 instruction and the rate-match bitmap-2 instruction per time unit. In this way, BS 110*b* may use less granularity in adjusting the one or more resource allocations when BS 110*b* is not aware of, or cannot determine with high probability, the particular resource elements used by BS 110*a* to transmit the one or more RS communications.

In some aspects, BS 110*b* may adjust the one or more radio resource allocations at the resource element level. For example, BS 110*b* may receive scheduling information associated with transmission of the one or more RS communications (e.g., from BS 110*a*, from another device included in the communication system, and/or the like). Accordingly, BS 110*b* may adjust the one or more radio resource allocations at the resource element level based on receiving the scheduling information. As another example, BS 110*b* may determine the quantity of resource block symbols associated with the one or more uplink communications with which the one or more RS communications are interfering, may determine whether the quantity of resource block symbols satisfies the threshold quantity of resource block symbols, and may adjust, based at least in part on determining that the quantity of resource block symbols satisfies the threshold quantity of resource block symbols, the one or more radio resource allocations at the resource element level. As a further example, BS 110*b* may determine the signal strength of the one or more RS communications, may determine whether the signal strength satisfies the threshold signal strength, and may adjust, based at least in part on determining that the signal strength satisfies the threshold signal strength, the one or more radio resource allocations at the resource element level.

In some aspects, to adjust the one or more resource allocations at the resource element level, BS 110*b* may determine one or more radio resources (e.g., one or more resource elements), associated with the BS 110*b*, with which the one or more RS communications are interfering (e.g., based on the scheduling information, based on the quantity of resource block symbols, based on the signal strength of the one or more RS communications, and/or the like), and may refrain from using the one or more radio resources, for an uplink communication on the PUSCH. For example, and as shown in FIG. 7C, BS 110*b* may refrain from using the one or more resource elements associated with the one or more RS communications, while allowing for the use of other resource elements, included in the same resource blocks as the one or more resource elements, for the uplink communication on the PUSCH.

BS 110*b* may refrain from using the one or more resource elements by transmitting configuration information to UEs 120 in the second coverage area to refrain from using the one or more resource elements to transmit the uplink communication, to use one or more other resource elements to use to transmit the uplink communication, and/or the like. The configuration information may include an instruction for UEs 120 in the second coverage area to transmit one or more zero-power channel state information reference signals (CSI-RSs) during the one or more resource elements that the one or more RS communications are received on at BS 110*b*. In this way, BS 110*b* may use greater granularity in adjusting the one or more resource allocations when BS 110*b* is aware of, or can determine with high probability, the particular resource elements used by BS 110*a* to transmit the one or more RS communications, which increases the efficiency of utilization of radio resources in the second coverage area.

Returning to FIG. 7B, BS 110*a* may mitigate and/or eliminate the interference, caused by the transmission of the one or more RS communications, with the one or more downlink communications transmitted by BS 110*a* in the first coverage area. As shown by reference number 730, BS 110*a* may determine to transmit one or more reference signal (RS) communications, and may reserve, based at least in part on determining to transmit the one or more RS communications, one or more radio resources, in the first coverage area, for transmitting the one or more RS communications. BS 110*a* may refrain from using the one or more radio resources to transmit one or more downlink communications to UEs 120 in the first coverage area. BS 110*a* may transmit the one or more RS communications using the one or more radio resources.

In some aspects BS 110*a* may receive the one or more radio resources at the resource block level, at the resource element level, and/or the like. For example, and as shown in FIG. 7B, BS 110*a* may reserve one or more resource blocks, associated with BS 110*a*, for transmitting the one or more RS communications. BS 110*a* may reserve the one or more radio resources at the resource block level based at least in part on, for example, being configured to semi-periodically transmit the one or more RS communications. In this way, any potential radio resources that may be used by BS 110 to transmit the one or more RS communications are reserved, which reduces the possibility of interference with the one or more downlink communications.

As another example, and as shown in FIG. 7C, BS 110*a* may reserve one or more resource elements, associated with BS 110*a*, for transmitting the one or more RS communications. BS 110*a* may reserve the one or more radio resources at the resource block level based at least in part on, for example, being configured to periodically transmit the one or more RS communications (e.g., based on receiving scheduling information and/or instructions to periodically transmit the one or more RS communications). In this way, since BS 110*a* is aware of the transmission schedule for the one or more RS communications, BS 110*a* may reserve the one or more radio resources with greater granularity, which increases the efficiency of utilization of radio resources in the first coverage area.

As indicated above, FIGS. 7A-7C are provided as an example. Other examples may differ from what is described with respect to FIGS. 7A-7C.

Figure 8:
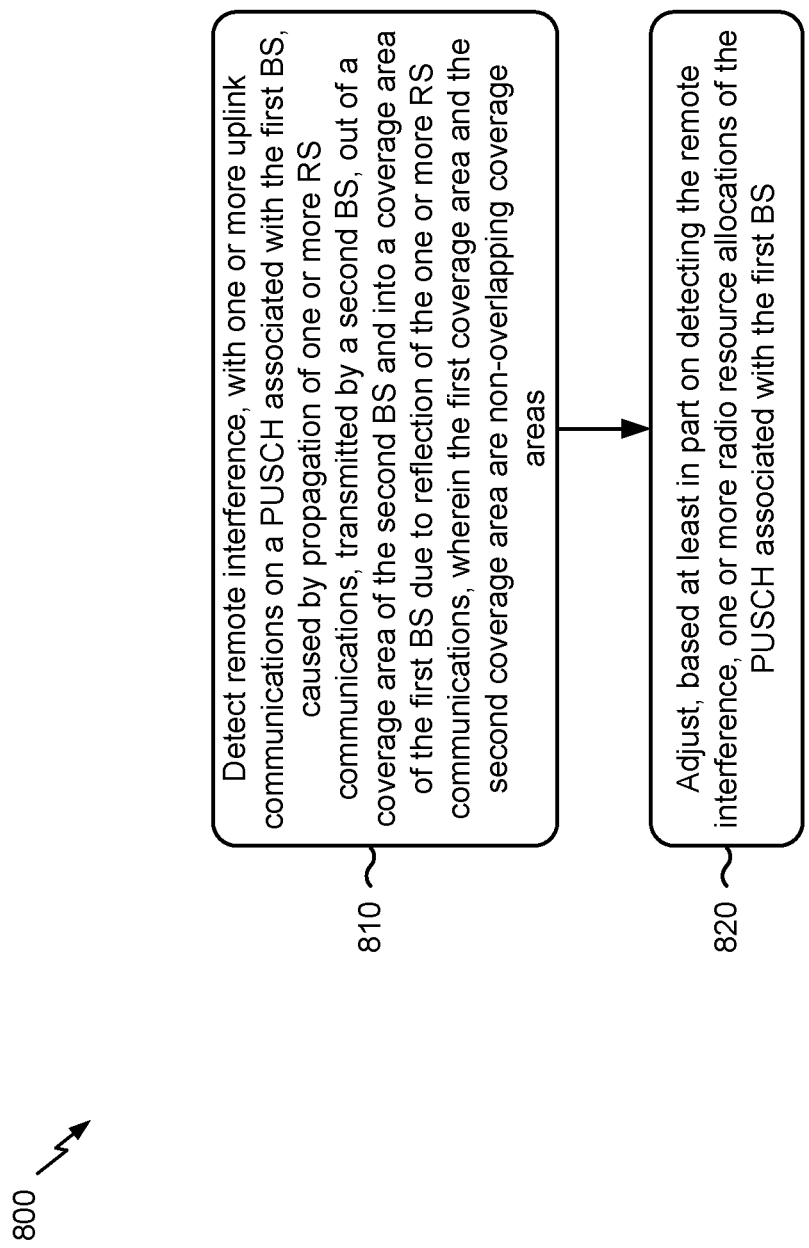
FIG. 8 is a diagram illustrating an example process performed, for example, by a BS, in accordance with various aspects of the present disclosure.

FIG. 8 is a diagram illustrating an example process 800 performed, for example, by a receiver, in accordance with various aspects of the present disclosure. Example process 800 is an example where a first BS (e.g., BS 110) performs resource rate matching for remote interference management.

As shown in FIG. 8, in some aspects, process 800 may include detecting remote interference, with one or more uplink communications on a PUSCH associated with the first BS, caused by propagation of one or more RS communications, transmitted by a second BS, out of a coverage area of the second BS and into a coverage area of the first BS due to reflection of the one or more RS communications, wherein the coverage area of the first BS and the coverage area of the second BS are non-overlapping coverage areas (block 810). For example, the first BS (e.g., using antenna 234, DEMOD 232, MIMO detector 236, receive processor 238, controller/processor 240, memory 242, and/or the like) may detect remote interference, with one or more uplink communications on a PUSCH associated with the first BS, caused by propagation of one or more RS communications, transmitted by a second BS, out of a coverage area of the second BS and into a coverage area of the first BS due to reflection of the one or more RS communications, as described above. In some implementations, the coverage area of the first BS and the coverage area of the second BS are non-overlapping coverage areas.

As further shown in FIG. 8, in some aspects, process 800 may include adjusting, based at least in part on detecting the remote interference, one or more radio resource allocations of the PUSCH associated with the first BS (block 820). For example, the first BS (e.g., using controller/processor 240, memory 242, and/or the like) may adjust, based at least in part on detecting the remote interference, one or more radio resource allocations of the PUSCH associated with the first BS, as described above.

Process 800 may include additional aspects, such as any single aspect or any combination of aspects described below and/or in connection with one or more other processes described elsewhere herein.

In a first aspect, adjusting the one or more radio resource allocations comprises determining one or more radio resources, associated with the first BS, with which the one or more RS communications are remotely interfering, and refraining from using the one or more radio resources for an uplink communication on the PUSCH. In a second aspect, alone or in combination with the first aspect, the one or more radio resources include one or more resource blocks associated with the receiver.

In a third aspect, alone or in combination with one or more of the first or second aspects, refraining from using the one or more radio resources for the uplink communication on the PUSCH comprises transmitting, to one or more UEs in the coverage area of the first BS, at least one of a rate-match bitmap-1 instruction to refrain from using the one or more radio resources for the uplink communication on the PUSCH, a rate-match bitmap-2 instruction to refrain from using the one or more radio resources for the uplink communication on the PUSCH, or a rate-match bitmap-3 instruction to refrain from using the one or more radio resources for the uplink communication on the PUSCH.

In a fourth aspect, alone or in combination with one or more of the first through third aspects, process 800 further comprises receiving scheduling information associated with transmission of the one or more RS communications, and adjusting the one or more radio resource allocations comprises refraining, based at least in part on the scheduling information, from using one or more radio resources, associated with the first BS, for an the uplink communication on the PUSCH, the one or more radio resources overlapping with the transmission of the one or more RS communications.

In a fifth aspect, alone or in combination with one or more of the first through fourth aspects, adjusting the one or more radio resource allocations comprises transmitting, to one or more UEs in the coverage area of the first BS, configuration information associated with the one or more radio resource allocations, the configuration information being for configuring the one or more UEs to transmit one or more zero-power CSI-RSs. In a sixth aspect, alone or in combination with one or more of the first through fifth aspects, transmitting the configuration information associated with the one or more radio resource allocations comprises at least one of periodically transmitting the configuration information or semi-periodically transmitting the configuration information.

In a seventh aspect, alone or in combination with one or more of the first through sixth aspects, detecting the remote interference with the one or more uplink communications comprises receiving a sequence of RS communications transmitted by the second BS and detecting the remote interference based at least in part on receiving the sequence of RS communications. In an eighth aspect, alone or in combination with one or more of the first through seventh aspects, adjusting the one or more radio resource allocations comprises determining a quantity of resource block symbols associated with the one or more uplink communications, determining whether the quantity of resource block symbols satisfies a threshold quantity of resource block symbols, and refraining, based at least in part on determining that the quantity of resource block symbols satisfies the threshold quantity of resource block symbols, from using one or more resource elements, associated with the resource block symbols, for an uplink communication on the PUSCH.

In a ninth aspect, alone or in combination with one or more of the first through eighth aspects, adjusting the one or more radio resource allocations comprises determining a quantity of resource block symbols associated with the one or more uplink communications, determining whether the quantity of resource block symbols satisfies a threshold quantity of resource block symbols, and refraining, based at least in part on determining that the quantity of resource block symbols does not satisfy the threshold quantity of resource block symbols, from using one or more resource blocks, associated with the resource block symbols, for an uplink communication on the PUSCH.

In a tenth aspect, alone or in combination with one or more of the first through ninth aspects, adjusting the one or more radio resource allocations comprises determining a signal strength of the one or more RS communications, determining whether the signal strength satisfies a threshold signal strength, and refraining, based at least in part on determining that the signal strength satisfies the threshold signal strength, from using one or more resource elements for an uplink communication on the PUSCH. In an eleventh aspect, alone or in combination with one or more of the first through tenth aspects, adjusting the one or more radio resource allocations comprises determining a signal strength of the one or more RS communications, determining whether the signal strength satisfies a threshold signal strength, and refraining, based at least in part on determining that the signal strength does not satisfy the threshold signal strength, from using one or more resource blocks for an uplink communication on the PUSCH.

Although FIG. 8 shows example blocks of process 800, in some aspects, process 8 may include additional blocks, fewer blocks, different blocks, or differently arranged blocks than those depicted in FIG. 8. Additionally, or alternatively, two or more of the blocks of process 800 may be performed in parallel.

Figure 9:
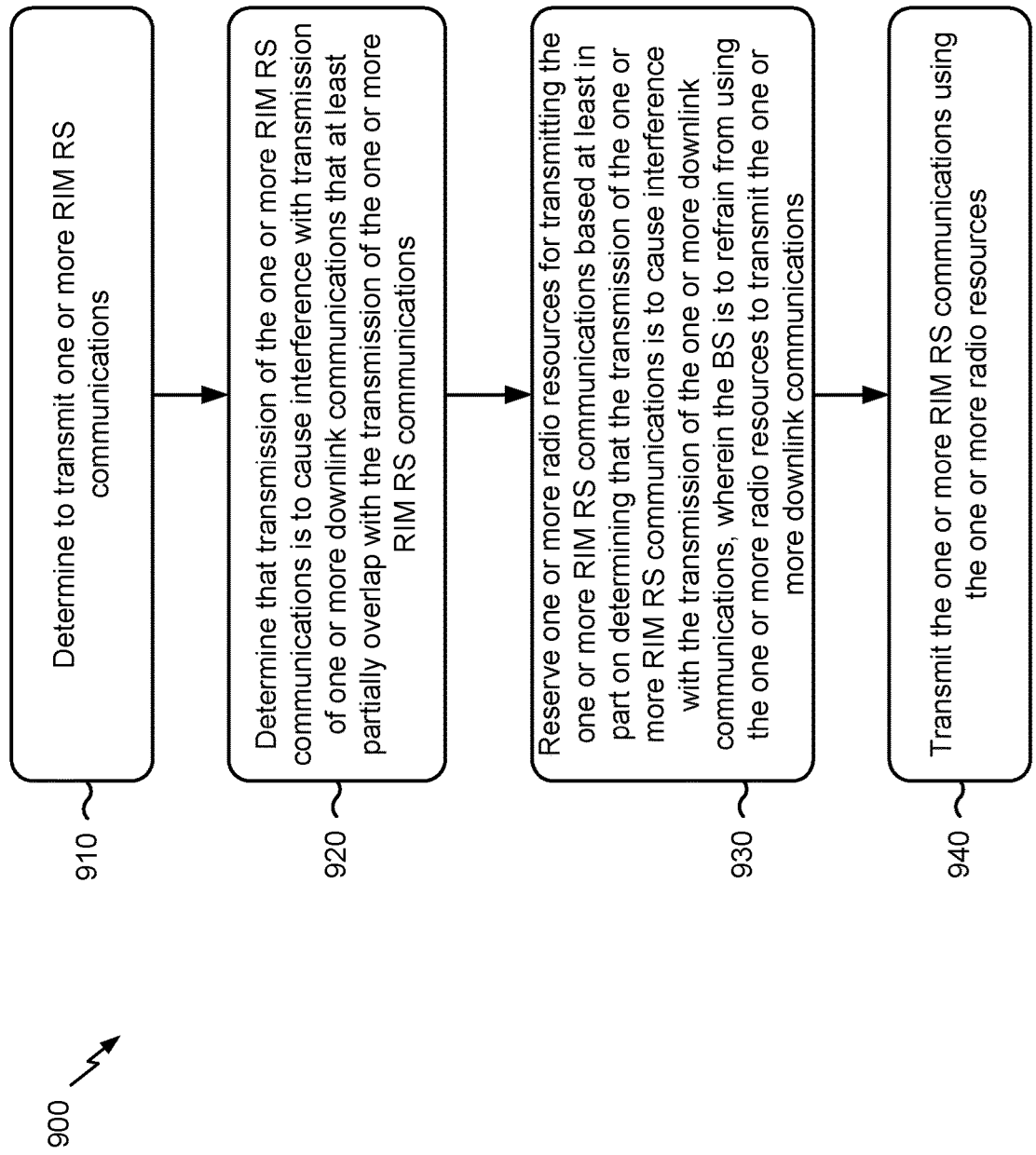
FIG. 9 is a diagram illustrating an example process performed, for example, by a BS, in accordance with various aspects of the present disclosure.

FIG. 9 is a diagram illustrating an example process 900 performed, for example, by a receiver, in accordance with various aspects of the present disclosure. Example process 900 is an example where a BS (e.g., BS 110) performs resource rate matching for remote interference management.

As shown in FIG. 9, in some aspects, process 900 may include determining to transmit one or more RIM RS communications (block 910). For example, the BS (e.g., using controller/processor 240, memory 242, and/or the like) may determine to transmit one or more RIM RS communications, as described above.

As further shown in FIG. 9, in some aspects, process 900 may include determining that transmission of the one or more RIM RS communications is to cause interference with transmission of one or more downlink communications that at least partially overlap with the transmission of the one or more RIM RS communications (block 920). For example, the BS (e.g., using controller/processor 240, memory 242, and/or the like) may determine that transmission of the one or more RIM RS communications is to cause interference with transmission of one or more downlink communications that at least partially overlap with the transmission of the one or more RIM RS communications, as described above.

As further shown in FIG. 9, in some aspects, process 900 may include reserving one or more radio resources for transmitting the one or more RIM RS communications based at least in part on determining that the transmission of the one or more RIM RS communications is to cause interference with the transmission of the one or more downlink communications, wherein the BS is to refrain from using the one or more radio resources to transmit the one or more downlink communications (block 930). For example, the BS (e.g., using controller/processor 240, memory 242 and/or the like) may reserving one or more radio resources for transmitting the one or more RIM RS communications based at least in part on determining that the transmission of the one or more RIM RS communications is to cause interference with the transmission of the one or more downlink communications, as described above. In some implementations, the BS is to refrain from using the one or more radio resources to transmit the one or more downlink communications.

As further shown in FIG. 9, in some aspects, process 900 may include transmitting the one or more RIM RS communications using the one or more radio resources (block 940). For example, the BS (e.g., using controller/processor 240, transmit processor 220, TX MIMO processor 230, MOD 232, antenna 234, and/or the like) may transmit the one or more RIM RS communications using the one or more radio resources, as described above.

Process 900 may include additional aspects, such as any single aspect or any combination of aspects described below and/or in connection with one or more other processes described elsewhere herein.

In a first aspect, the one or more radio resources include at least one of one or more resource blocks associated with the BS or one or more resource elements associated with the BS. In a second aspect, alone or in combination with the first aspect, process 900 further comprises receiving scheduling information associated with transmitting the one or more RS communications, and reserving the one or more radio resources comprises reserving, based on receiving the scheduling information, one or more resource elements associated with the BS.

Although FIG. 9 shows example blocks of process 900, in some aspects, process 8 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first base station (BS), comprising:
   detecting remote interference, with one or more uplink communications on a physical uplink shared channel (PUSCH) associated with the first BS, caused by propagation of one or more reference signal (RS) communications, transmitted by a second BS, out of a coverage area of the second BS and into a coverage area of the first BS due to reflection of the one or more RS communications,
      wherein the coverage area of the first BS and the coverage area of the second BS are non-overlapping coverage areas; and
   adjusting, based at least in part on detecting the remote interference, one or more radio resource allocations of the PUSCH associated with the first BS.

2. The method of claim 1, wherein adjusting the one or more radio resource allocations comprises:
   determining one or more radio resources, associated with the first BS, with which the one or more RS communications are remotely interfering; and refraining from using the one or more radio resources for an uplink communication on the PUSCH.

3. The method of claim 2, wherein the one or more radio resources comprise:
one or more resource blocks associated with the first BS.

4. The method of claim 2, wherein refraining from using the one or more radio resources for the uplink communication on the PUSCH comprises:
transmitting, to one or more user equipment (UEs) in the coverage area of the first BS, at least one of:
a rate-match bitmap-1 instruction to refrain from using the one or more radio resources for the uplink communication on the PUSCH,
a rate-match bitmap-2 instruction to refrain from using the one or more radio resources for the uplink communication on the PUSCH, or
a rate-match bitmap-3 instruction to refrain from using the one or more radio resources for the uplink communication on the PUSCH.

5. The method of claim 1, further comprising:
receiving scheduling information associated with transmission of the one or more RS communications; and
wherein adjusting the one or more radio resource allocations comprises:
refraining, based at least in part on the scheduling information, from using one or more radio resources, associated with the first BS, for an uplink communication on the PUSCH,
wherein the one or more radio resources overlap with the transmission of the one or more RS communications.

6. The method of claim 1, wherein adjusting the one or more radio resource allocations comprises:
transmitting, to one or more user equipment (UEs) in the coverage area of the first BS, configuration information associated with the one or more radio resource allocations,
wherein the configuration information is to configure the one or more UEs to transmit one or more zero-power channel state information reference signals (CSI-RSs).

7. The method of claim 6, wherein transmitting the configuration information associated with the one or more radio resource allocations comprises at least one of:
periodically transmitting the configuration information, or semi-periodically transmitting the configuration information.

8. The method of claim 1, wherein detecting the remote interference with the one or more uplink communications comprises:
receiving a sequence of RS communications transmitted by the second BS; and
detecting the remote interference based at least in part on receiving the sequence of RS communications.

9. The method of claim 1, wherein adjusting the one or more radio resource allocations comprises:
determining a quantity of resource block symbols associated with the one or more uplink communications;
determining whether the quantity of the resource block symbols satisfies a threshold quantity of the resource block symbols; and
refraining, based at least in part on determining that the quantity of the resource block symbols satisfies the threshold quantity of the resource block symbols, from using one or more resource elements, associated with the resource block symbols, for an uplink communication on the PUSCH.

10. The method of claim 1, wherein adjusting the one or more radio resource allocations comprises:
determining a quantity of resource block symbols associated with the one or more uplink communications;
determining whether the quantity of the resource block symbols satisfies a threshold quantity of the resource block symbols; and
refraining, based at least in part on determining that the quantity of the resource block symbols does not satisfy the threshold quantity of the resource block symbols, from using one or more resource blocks, associated with the resource block symbols, for an uplink communication on the PUSCH.

11. The method of claim 1, wherein adjusting the one or more radio resource allocations comprises:
determining a signal strength of the one or more RS communications;
determining whether the signal strength satisfies a threshold signal strength; and
refraining, based at least in part on determining that the signal strength satisfies the threshold signal strength, from using one or more resource elements for an uplink communication on the PUSCH.

12. The method of claim 1, wherein adjusting the one or more radio resource allocations comprises:
determining a signal strength of the one or more RS communications;
determining whether the signal strength satisfies a threshold signal strength; and
refraining, based at least in part on determining that the signal strength does not satisfy the threshold signal strength, from using one or more resource blocks for an uplink communication on the PUSCH.

13. A first base station (BS) for wireless communication, comprising:
a memory; and
one or more processors coupled to the memory, the memory and the one or more processors configured to:
detect remote interference, with one or more uplink communications on a physical uplink shared channel (PUSCH) associated with the first BS, caused by propagation of one or more reference signal (RS) communications, transmitted by a second BS, out of a coverage area of the second BS and into a coverage area of the first BS due to reflection of the one or more RS communications,
wherein the coverage area of the first BS and the coverage area of the second BS are non-overlapping coverage areas; and
adjust, based at least in part on detecting the remote interference, one or more radio resource allocations of the PUSCH associated with the first BS.

14. The first BS of claim 13, wherein the one or more processors, when adjusting the one or more radio resource allocations, are configured to:
determine one or more radio resources, associated with the first BS, with which the one or more RS communications are remotely interfering; and
refrain from using the one or more radio resources for an uplink communication on the PUSCH.

15. The first BS of claim 14, wherein the one or more radio resources comprise:
one or more resource blocks associated with the first BS.

16. The first BS of claim 14, wherein the one or more processors, when refraining from using the one or more radio resources for the uplink communication on the PUSCH, are configured to:

transmit, to one or more user equipment (UEs) in the coverage area of the first BS, at least one of:
a rate-match bitmap-1 instruction to refrain from using the one or more radio resources for the uplink communication on the PUSCH,
a rate-match bitmap-2 instruction to refrain from using the one or more radio resources for the uplink communication on the PUSCH, or
a rate-match bitmap-3 instruction to refrain from using the one or more radio resources for the uplink communication on the PUSCH.

17. The first BS of claim 13, wherein the one or more processors are further configured to:
receive scheduling information associated with transmission of the one or more RS communications; and
wherein the one or more processors, when adjusting the one or more radio resource allocations, are configured to:
refrain, based at least in part on the scheduling information, from using one or more radio resources, associated with the first BS, for an uplink communication on the PUSCH,
wherein the one or more radio resources overlap with the transmission of the one or more RS communications.

18. The first BS of claim 13, wherein the one or more processors, when adjusting the one or more radio resource allocations, are configured to:
transmit, to one or more user equipments (UEs) in the coverage area of the first BS, configuration information associated with the one or more radio resource allocations,
wherein the configuration information is to configure the one or more UEs to transmit one or more zero-power channel state information reference signals (CSI-RSs).

19. The first BS of claim 18, wherein the one or more processors, when transmitting the configuration information associated with the one or more radio resource allocations, are configured to at least one of:
periodically transmit the configuration information, or
semi-periodically transmit the configuration information.

20. The first BS of claim 13, wherein the one or more processors, when detecting the remote interference with the one or more uplink communications, are configured to:
receive a sequence of RS communications transmitted by the second BS; and
detect the remote interference based at least in part on receiving the sequence of RS communications.

21. The first BS of claim 13, wherein the one or more processors, when adjusting the one or more radio resource allocations, are configured to:
determine a quantity of resource block symbols associated with the one or more uplink communications;
determine whether the quantity of the resource block symbols satisfies a threshold quantity of the resource block symbols; and
refrain, based at least in part on determining that the quantity of the resource block symbols satisfies the threshold quantity of the resource block symbols, from using one or more resource elements, associated with the resource block symbols, for an uplink communication on the PUSCH.

22. The first BS of claim 13, wherein the one or more processors, when adjusting the one or more radio resource allocations, are configured to:
determine a quantity of resource block symbols associated with the one or more uplink communications;
determine whether the quantity of the resource block symbols satisfies a threshold quantity of the resource block symbols; and
refrain, based at least in part on determining that the quantity of the resource block symbols does not satisfy the threshold quantity of the resource block symbols, from using one or more resource blocks, associated with the resource block symbols, for an uplink communication on the PUSCH.

23. The first BS of claim 13, wherein the one or more processors, when adjusting the one or more radio resource allocations, are configured to:
determine a signal strength of the one or more RS communications;
determine whether the signal strength satisfies a threshold signal strength; and
refrain, based at least in part on determining that the signal strength satisfies the threshold signal strength, from using one or more resource elements for an uplink communication on the PUSCH.

24. The first BS of claim 13, wherein the one or more processors, when adjusting the one or more radio resource allocations, are configured to:
determine a signal strength of the one or more RS communications;
determine whether the signal strength satisfies a threshold signal strength; and
refrain, based at least in part on determining that the signal strength does not satisfy the threshold signal strength, from using one or more resource blocks for an uplink communication on the PUSCH.

* * * * *